(12) United States Patent
Omori

(10) Patent No.: US 7,448,295 B2
(45) Date of Patent: Nov. 11, 2008

(54) TILTING CIRCULAR TABLE DEVICE

(75) Inventor: Mitsuru Omori, Ishikawa (JP)

(73) Assignee: Tsudakoma Kogyo Kabushiki Kaisha (JP)

( * ) Notice: Subject to any disclaimer, the term of this patent is extended or adjusted under 35 U.S.C. 154(b) by 538 days.

(21) Appl. No.: 11/057,439

(22) Filed: Feb. 14, 2005

(65) Prior Publication Data

US 2005/0229818 A1  Oct. 20, 2005

(30) Foreign Application Priority Data

Apr. 15, 2004 (JP) ............................. 2004-119808

(51) Int. Cl.
*G05G 11/00* (2006.01)
(52) U.S. Cl. ................. 74/490.08; 74/490.13
(58) Field of Classification Search .............. 74/490.07, 74/490.08, 490.13; 108/1, 2, 4, 6, 7, 20, 108/138, 139; 269/61, 71
See application file for complete search history.

(56) References Cited

U.S. PATENT DOCUMENTS

| | | | | |
|---|---|---|---|---|
| 2,477,169 A | * | 7/1949 | Brekelbaum | 269/60 |
| 2,956,595 A | * | 10/1960 | Warrick et al. | 144/39 |
| 3,022,066 A | * | 2/1962 | Benes | 269/61 |
| 3,514,090 A | * | 5/1970 | Wuesthoff | 269/60 |
| 4,610,442 A | * | 9/1986 | Oku et al. | 269/73 |
| 4,619,208 A | * | 10/1986 | Kurrasch | 108/147 |
| 4,909,682 A | * | 3/1990 | Rudzyanskas et al. | 409/145 |
| 5,031,547 A | * | 7/1991 | Hirose | 108/140 |
| 5,090,267 A | * | 2/1992 | Gramling | 74/427 |
| 5,163,651 A | * | 11/1992 | Matsumoto | 248/425 |
| 5,207,115 A | * | 5/1993 | Takei | 74/479.01 |
| 5,323,712 A | * | 6/1994 | Kikuiri | 108/20 |
| 5,794,541 A | * | 8/1998 | Hirose | 108/20 |
| 6,622,586 B2 | * | 9/2003 | Scheidegger et al. | 74/490.08 |

FOREIGN PATENT DOCUMENTS

| | | | |
|---|---|---|---|
| JP | 2793849 | | 3/1991 |
| JP | 03073240 | * | 3/1991 |

* cited by examiner

*Primary Examiner*—Richard W L Ridley
*Assistant Examiner*—Matthew Johnson
(74) *Attorney, Agent, or Firm*—The Webb Law Firm

(57) ABSTRACT

A tilting circular table device includes: a frame; a tilting table supported on the frame so as to angularly rotate about a first axis; a circular table disposed in the tilting table so as to angularly rotate; an input shaft for rotating the circular table and disposed on the tilting table so as to angularly rotate about a second axis; a drive motor having an output shaft for rotating the input shaft and angularly rotatable about the third axis; and a body portion attached to the frame so as to angularly rotate about the third axis; and a follower mechanism for making the body portion driven about the second axis, following rotation of the tilting table.

10 Claims, 4 Drawing Sheets

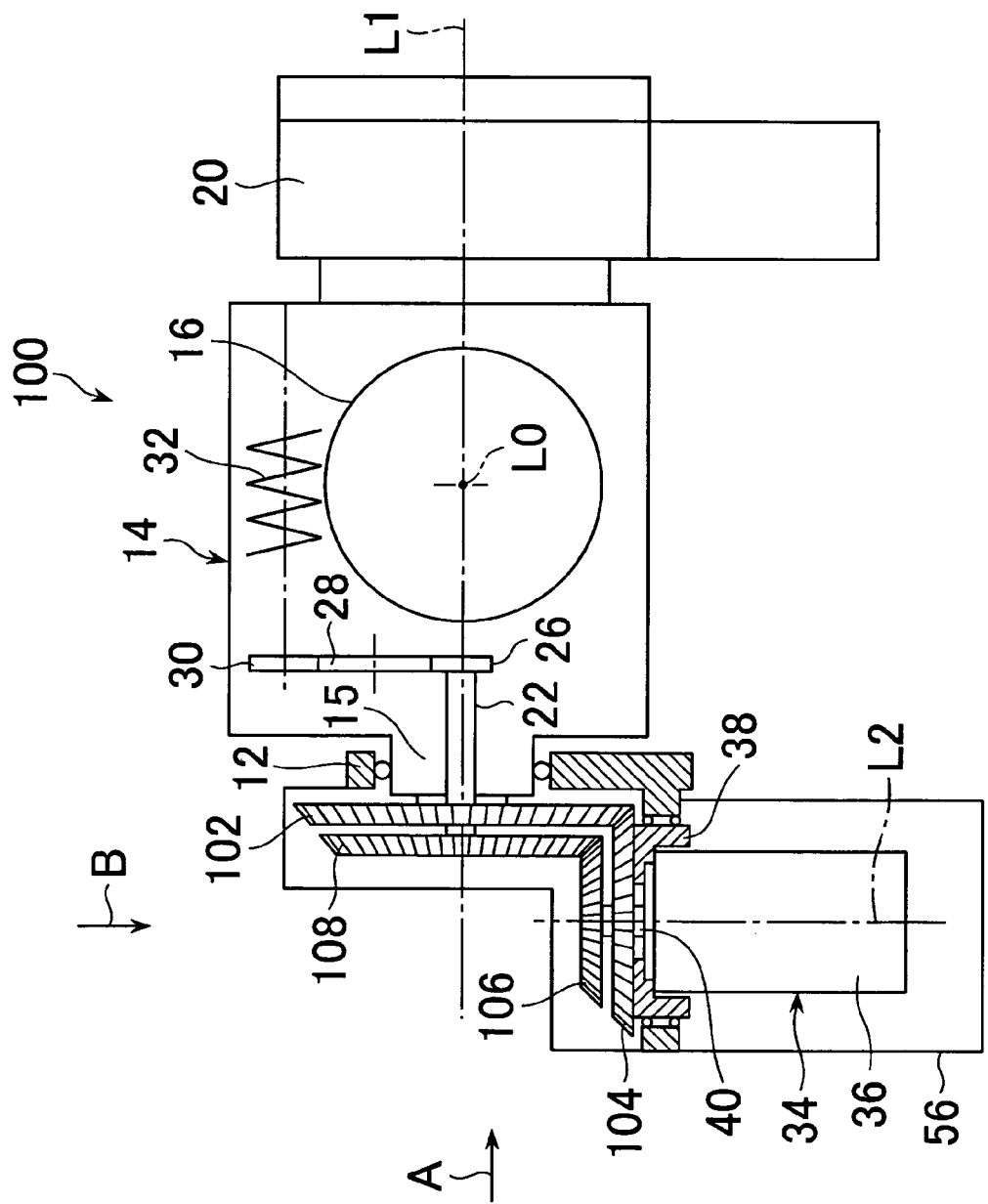

TILTING CIRCULAR TABLE DEVICE

BACKGROUND OF THE INVENTION

1. Field of the Invention

The present invention relates to a tilting circular table device, and more particularly, a tilting circular table device for use as an attachment to a machine tool.

2. Description of Prior Art

In machining a workpiece by a machine tool, a tilting circular table device is used when rotational dividing operation and tilting dividing operation of the workpiece are required. The workpiece is assembled into a circular table of the tilting circular table device.

A tilting circular table device of this type has such a function as to hold an angle of inclination of a workpiece, in turn, a circular table, while rotating the circular table in case of performing rotational index of the workpiece relative to a machine tool, and to hold a rotational angle of the workpiece, in turn, the circular table, while tilting the circular table in case of performing tilting index of the workpiece. In other words, a tilting table drive motor only tilts, not rotates, the circular table. Also, the circular table drive motor only rotates, not tilts, the circular table.

As one of such tilting circular table devices, there is known a tilting circular table device comprising: a frame; a tilting table supported on the frame so as to rotate angularly; a circular table disposed on the tilting table so as to rotate angularly; an input shaft disposed on the tilting table so as to rotate angularly and rotating the circular table; a circular table drive motor provided with a body portion disposed on the frame; a rotation transmitting mechanism for transmitting rotation of an output shaft of the circular table drive motor to the input shaft; and the tilting table drive motor for angularly rotating the tilting table (Patent Document 1).

The rotation transmitting mechanism of this tilting circular table device includes a differential mechanism, whose differential characteristic is set such that, while the circular table drive motor is stopped, the differential mechanism rotates the input shaft synchronously in the same direction by the rotational angle, if the tilting table is angularly rotated by the tilting table drive motor, but while the tilting table drive motor is stopped, the differential mechanism rotates the input shaft only, if the input shaft is angularly rotated by the circular table drive motor.

This tilting circular table device has the tilting table drive motor and the circular table drive motor disposed on the frame and drives the circular table by the circular table drive motor through the differential mechanism having a proper differential characteristic, thereby tilting the circular table without rotating it or rotating the circular table without tilting it.

In the foregoing conventional tilting circular table device, however, since the differential mechanism inside the frame combines each rotation axis and gear of the circular table and the tilting table so that a predetermined gear ratio can be obtained, which makes the structure inside the differential mechanism complicated. As a result, when the differential mechanism is broken, a great deal of labor is required for reparation of the broken differential mechanism as well as for maintenance of the differential mechanism.

Furthermore, in the conventional tilting circular table device, since the differential mechanism has a lot of gears, it is impossible to avoid backlash generating among those meshed gears. Due to this, when the differential mechanism converts the rotational direction of the output shaft of the circular table drive motor or of the tilting table drive motor from one to the other, a range where the rotation is not transmitted due to the backlash is expanded. As a result, if the differential mechanism using a lot of gears is applied to a machine tool for which fine and accurate angular control of a circular table and a tilting table is required, accuracy in angle of angular rotation of the circular table and the tilting table cannot be improved.

[Patent Document 1] Japanese Patent No. 2793849 Official Gazette

SUMMARY OF THE INVENTION

An object of the present invention is to realize fine and accurate control of an angular rotation of a circular table and a tilting table with a relatively simple constitution and to prevent rotation of the circular table when the tilting table is angularly rotated.

A tilting circular table device according to the present invention comprises: a frame; a tilting table supported on the frame so as to angularly rotate about a first axis; a circular table disposed on the tilting table so as to angularly rotate; an input shaft for rotating the circular table and disposed on the tilting table so as to angularly rotate about a second axis; a drive motor having an output shaft which angularly rotates the input shaft and is angularly rotatable about a third axis, and a body portion attached to the frame so as to angularly rotate about the third axis; and a follower mechanism for rotating the body portion about the third axis, following the tilting table.

The follower mechanism may be driven to rotate the body portion so that no relative rotation is caused between the input shaft and the tilting table when the input shaft rotates, following the angular rotation of the tilting table. In this case, the input shaft is rotated by a predetermined rotational angle by the rotation of the body portion. The predetermined rotational angle here means the rotational angle of the input shaft when the tilting table is rotated in a state that the output shaft is made relatively irrotatable to the body portion.

The follower mechanism may make the body portion driven so that the angle of angular rotation of the tilting table about the first axis and the angle of angular rotation of the input shaft about the second shaft may coincide.

The output shaft may be made relatively irrotatable to the body portion while the rotation of the output shaft relative to the body portion is stopped.

The input shaft may be made to rotate about the second axis in the same rotational direction and by the same angle of angular rotation as the rotational direction and the angle of angular rotation of the tilting table about the first axis relative to the frame.

In the tilting circular table device, if the tilting table is rotated about the first axis by a rotational angle relative to the frame, the body portion of the drive motor is rotated about the third axis by the follower mechanism, so that the output shaft of the drive motor is also rotated about the third axis relative to the frame.

By this, the input shaft is driven to rotate, following the rotation of the tilting table so as to prevent the circular table from rotating due to the rotation of the tilting table.

In particular, the input shaft, if rotated about the second axis relative to the frame by the same rotational angle as that of the tilting table and in the same direction as the rotational direction of the tilting table, is rotated relative to the frame, following the angular rotation of the tilting table. As a result, the input shaft does not rotate relative to the tilting table.

Consequently, since no difference is caused between the angle of angular rotation of the tilting table relative to the frame and the rotational angle of the input shaft, the circular table is not rotated relative to the tilting table, in the tilting circular table device, even if the tilting table is tilted.

The follower mechanism, having a simple constitution without including any device for angularly rotating the tilting table, facilitates maintenance work of the tilting circular table device.

The tilting circular table device may further comprise a rotation transmitting mechanism for transmitting the rotation of the output shaft to the input shaft.

The rotation transmitting mechanism may include a first pulley attached to the output shaft so as not to rotate relatively, a second pulley attached to the input shaft so as not to rotate relatively, and a first endless belt for transmitting the rotation of the first pulley to the second pulley. Or, the rotation transmitting mechanism may include a first gear attached to the output shaft so as not to rotate relatively, and a second gear attached to the input shaft so as not to rotate relatively and to be rotated following the rotation of the first gear. Otherwise, the rotation transmitting mechanism may include a first crank attached to the output shaft so as not to rotate relatively, a second crank attached to the input shaft so as not to rotate relatively, and a first connecting rod for transmitting the rotation of the first crank to the second crank.

The follower mechanism may include a third pulley attached to the body portion so as not to rotate relatively, a fourth pulley attached to the tilting table so as not to rotate relatively, and a second endless belt for transmitting the rotation of the third pulley to the fourth pulley. Or, the follower mechanism may include a third gear attached to the body portion so as not to rotate relatively, and a fourth gear attached to the tilting table so as not to rotate relatively and to be rotated following the rotation of the third gear. Otherwise, the follower mechanism may include a third crank attached to the body portion so as not to rotate relatively, and a fourth crank attached to the tilting table so as not to rotate relatively, and a second connecting rod for transmitting the rotation of the third crank to the fourth crank.

Since the rotation transmitting mechanism and the follower mechanism can be composed of belts, gears, cranks and the like, the constitution of the rotation transmitting mechanism and the follower mechanism of the present invention are comparatively simple in comparison with the driving mechanism of the prior art.

The body portion may be attached to the frame so as to be angularly rotated so that the third axis may become parallel or orthogonal to the first axis.

The input shaft may be disposed on the tilting table so that the second axis may coincide with the first axis.

It is possible that the input shaft is disposed on the tilting table so that the second axis may become parallel to the first axis, or disposed on the tilting table so that the second axis may be perpendicular to the first axis.

BRIEF DESCRIPTION OF THE DRAWINGS

FIG. 4 is a schematic diagram showing a third embodiment of the tilting circular table device according to the present invention.

PREFERRED EMBODIMENTS OF THE INVENTION

The First Embodiment

Endless Belt Type

Figure 1:
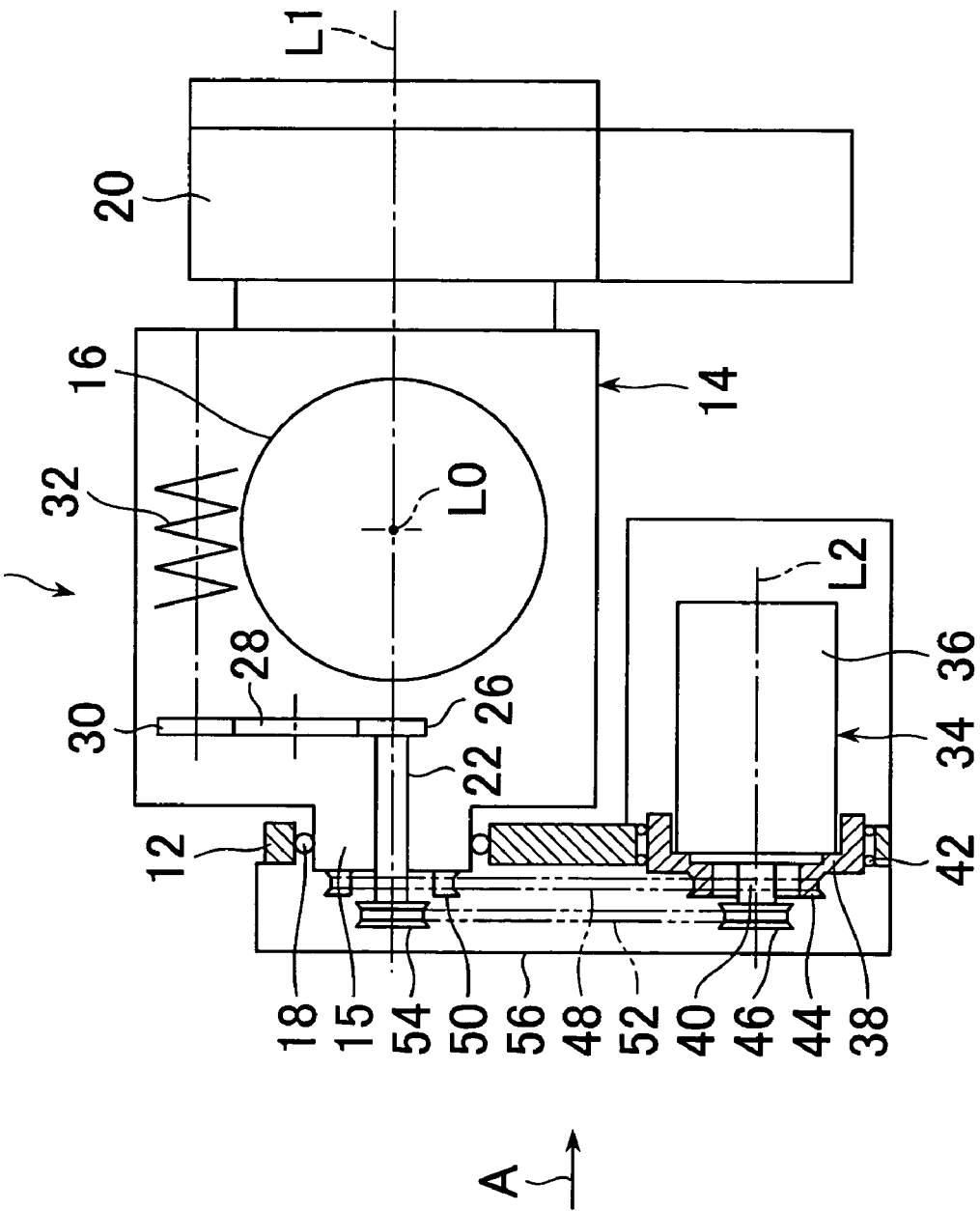
FIG. 1 is a schematic diagram showing a first embodiment of the tilting table device according to the present invention.
Figure 2:
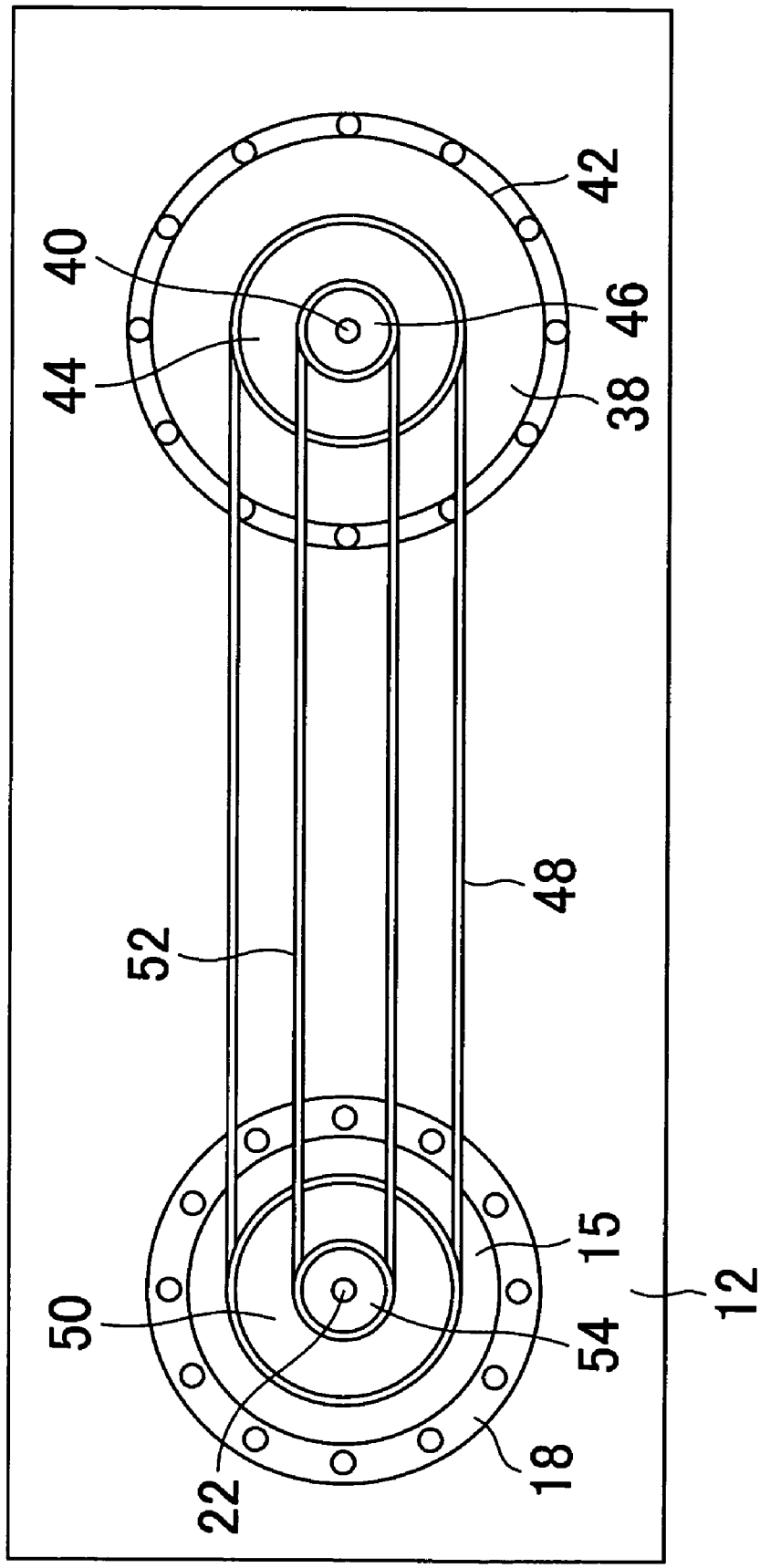
FIG. 2 is a schematic diagram of a side face of the tilting circular table device shown in FIG. 1.

Referring to FIGS. 1 and 2, a tilting circular table 10 is used with a frame 12 removably assembled into a machine tool (not shown) and with a workpiece (not shown) assembled into a circular table 16 which is attached so as to angularly rotate about an axis L0 relative to a tilting table 14.

An axis L1 passes the center of the circular table 16 in the direction orthogonal to the rotation axis of the circular table 16 and extends within a plane parallel to a plane of the circular table 16 for mounting the workpiece.

As shown in FIG. 1, the tilting table 14 is supported on the frame 12 so as to angularly rotate through a bearing 18 inserted into an tilting shaft 15 formed on the tilting table 14. The tilting table 14 is angularly rotated about the axis L1, following the rotation of an output shaft of a tilting table drive motor provided in a tilting drive unit 20. The tilting drive unit 20 is disposed on the frame 12.

An input shaft 22 is disposed on the tilting table 14 so as to relatively rotate, and has a gear 26 assembled into its one end so as not to rotate relatively. The gear 26 to be rotated by the input shaft 22 rotates a gear 30 through a gear 28 disposed on the tilting table 14.

The gear 30 is attached relatively irrotatably to a worm gear 32 which is disposed on the tilting table 14 so as to rotate relatively.

The worm gear 32 meshes with a worm wheel (not shown) assembled into the circular table 16 so as not to rotate relatively. The worm gear 32 is rotated following the rotation of the gear 30 and rotates the circular table 16 through the worm wheel.

In a state that the tilting table 14 does not rotate relative to the frame 12, when the input shaft 22 angularly rotates in one direction about the axis L1 relative to the frame 12 (in other words, the tilting table 14), the gears 26, 28, 30 and the worm gear 32 are rotated in one direction about the axis L1 relative to the tilting table 14. Due to this, the circular table 16 is rotated in one direction about the axis L0 relative to the tilting table 14 by a rotational angle corresponding to the rotational angle of the input shaft 22 relative to the frame 12.

In a state that the input shaft 22 does not rotate relative to the frame 12, when the tilting table 14 angularly rotates in one direction about the axis L1 (in other words, the input shaft 22) relative to the frame 12, the gears 28, 30 and the worm gear 32 rotate in one direction about the axis L1 (in other words, the input shaft 22).

At this time, the gear 28 rotates in one direction around the gear 26 in a state of meshing with the gear 26. That is to say, the gear 28 revolves about the axis L1 while rotating in one direction. By this, the gear 30 and the worm gear 32 also revolve in one direction about the axis L1 while respectively rotating in the other direction about their axes. As a result, the circular table 16 is rotated in one direction relative to the tilting table 14 by a rotational angle corresponding to the rotational angle of the tilting table 14 relative to the frame 12 (in other words, the input shaft 22).

Therefore, the circular table 16 disposed on the tilting table 14 is rotated relative to the tilting table 14 by the same angle as the rotational angle of the tilting table 14 relative to the frame 12.

A circular table drive motor 34 for outputting torque for rotating the circular table 16 has a body portion 36, a drive motor base 38 assembled into the body portion 36 so as not to move relatively, and an output shaft 40 attached to the body portion 36 so as not to rotate relatively. The circular table drive motor 34 is disposed nearer than the output shaft 40 to the side of the tilting drive unit 20.

The circular table drive motor 34, while not rotating the output shaft 40, keeps the output shaft 40 and the body portion 36 relatively irrotatable.

The drive motor base 38 is supported on the frame 12 so as not to rotate relatively through a bearing 42 attached to the frame 12. The rotation axis of the bearing 42 and that of the output shaft 40 are coincident with an axis L2. The output shaft 40 of the circular table drive motor 34 (in other words, the axis L2) is provided parallel to the axis L1.

The drive motor base 38 is provided with a relatively irrotatable tilting input pulley (a third pulley) 44. The output shaft 40 is provided with a relatively irrotatable rotation output pulley (a first pulley) 46. The tilting input pulley 44 and the rotation output pulley 46 rotate about the axis L2. The tilting input pulley 44 is disposed on the side of the body portion 36 (the side of the arrow A) relative to the rotation output pulley 46.

The tilting input pulley 44 transmits the rotation of an inclination transmitting endless belt (a second endless belt) 48 to the drive motor base 38. The inclination transmitting endless belt 48 is spread over a tilting input pulley 44 and a tilting output pulley (a fourth pulley) 50 which is assembled into the tilting table 14 so as not to rotate relatively and is given tension. The tilting output pulley 50 is angularly rotated about the axis L1, following the angular rotation of the tilting table 14. Therefore, the tilting input pulley 44, the tilting output pulley 50 and the inclination transmitting endless belt 48 constitute the follower mechanism.

The diameter of a pitch circle of the tilting output pulley 50 is set to be identical with the diameter of a pitch circle of the tilting input pulley 44 so that the angle of angular rotation of the drive motor base 38 may become identical with the angle of angular rotation of the tilting table 14. The inclination transmitting endless belt 48 is spread over the tilting output pulley 50 and the tilting input pulley 44 in a state of an open belt so that the rotational direction of the drive motor base 38 as seen from one direction (e.g., the direction of the arrow A) parallel to the axis L1 may become identical with the rotational direction of the tilting table 14 as seen from the direction of the arrow A. By this, the angular rotation of the drive motor base 38 is driven, following the angular rotation of the tilting table 14.

The rotation output pulley 46 transmits the rotation of the output shaft 40 to a rotation transmitting endless belt (a first endless belt) 52. The rotation transmitting endless belt 52 is spread over the rotation output pulley 46 and the rotation input pulley (a second pulley) 54 which is assembled into the input shaft 22 so as not to rotate relatively, so as to transmit the rotation and so as to be given tension. The rotation input pulley 54 is rotated about the axis L1, following the rotation of the output shaft 40. Therefore, the rotation output pulley 46, the rotation input pulley 54 and the rotation transmitting endless belt 52 constitute a rotation transmitting mechanism.

The diameter of a pitch circle of the rotation output pulley 46 is set to be identical with the diameter of a pitch circle of the rotation input pulley 54 so that the rotational angle of the input shaft 22 may become identical with the rotational angle of the output shaft 40. The rotation transmitting endless belt 52 is spread over the rotation output pulley 46 and the rotation input pulley 54 in a state of an open belt so that the rotational direction of the output shaft 40 as seen from the direction of the arrow A may become identical with the rotational direction of the input shaft 22 as seen from the direction of the arrow A. Due to this, the rotation of the input shaft 22 follows the rotation of the output shaft 40.

The follower mechanism transmits the rotational direction and rotational angle of the tilting table 14 to the body portion 36 through the tilting shaft 15, the tilting output pulley 50, the inclination transmitting endless belt 48, the tilting input pulley 44 and the drive motor base 38.

In order to prevent an operator from directly contacting the rotation transmitting mechanism (the rotation output pulley 46, rotation input pulley 54 and rotation transmitting endless belt 52), the follower mechanism (the tilting input pulley 44, tilting output pulley 50 and inclination transmitting endless belt 48) and the circular table drive motor 34, a cover 56 is removably attached to the frame 12 so as to cover the rotation transmitting mechanism, the follower mechanism and the circular table drive motor 34.

The tilting circular table device 10 behaves as follows.

When tilting the tilting table 14, namely, when rotating the circular table 16 about the axis L1 relative to the frame 12, that is, the tilting drive unit 20 rotates the output shaft of its tilting drive motor clockwise as seen in the direction of the arrow A, in a state that the output shaft 40 of the circular table drive motor 34 is made relatively irrotatable to the body portion 36.

By this, since the tilting table 14 is angularly rotated about the axis L1 relative to the frame 12, that is, clockwise as seen from the direction of the arrow A, the circular table 16 is angularly rotated about the axis L1 relative to the frame 12, that is, clockwise as seen from the direction of the arrow A by a predetermined angle.

Furthermore, when the tilting table 14 is rotated, the drive motor base 38 is angularly rotated relative to the frame 12, that is, clockwise as seen from the direction of the arrow A through the tilting shaft 15 of the tilting table 14, the tilting output pulley 50, the inclination transmitting endless belt 48 and the tilting input pulley 44 in this order.

When the drive motor base 38 is rotated about the axis L2 relative to the frame 12, that is, clockwise as seen from the direction of the arrow A, the body portion 36 is rotated about the axis L2. At this time, since the body portion 36 and the output shaft 40 are placed in a relatively irrotatable state, the output shaft 40 is rotated relative to the frame 12, that is, clockwise as seen from the direction of the arrow A. The rotation of the output shaft 40 rotates the input shaft 22 relative to the frame 12, that is, clockwise as seen from the direction of the arrow A by the same angle as the rotational angle of the tilting table 14 through the rotation output pulley 46, the rotation transmitting endless belt 52 and the rotation input pulley 54.

In other words, the follower mechanism positively rotates the body portion 36 in a state that the output shaft 40 is in a relatively irrotatable to the body portion 36, so as to cause no relative rotation between the input shaft 22 and the tilting table 14.

As mentioned above, the input shaft 22 rotates the tilting table 14 about the same axis as the axis L1 of the tilting table 14 by the same angle in the same direction. The gears 28, 30 and the worm gear 32 are revolved about the axis L1 in the same direction as the tilting table 14 by the same angle, but do not rotate about their own axes. For this reason, as in the first embodiment, when the axis L1 of the tilting table 14 and the axis of the input shaft 22 coincide, the circular table 16 does not rotate about the axis L0 because the input shaft 22 and the tilting table 14 are rotated relative to the frame 12, that is, in the same direction as seen from the direction of the arrow A by the same angle.

When the circular table 16 is rotated, namely, when the circular table 16 is rotated relative to the tilting table 14, that is, clockwise about the axis L0 as seen from a workpiece mounting plane of the circular table 16, the circular table drive motor 34 rotates its output shaft 40 relative to the body portion 36, that is, clockwise as seen from the direction of the arrow A in a state that the output shaft of the tilting drive motor of the tilting drive motor device 20 is made irrotatable.

At this time, since the tilting table 14 does not rotate about the axis L1 relative to the frame 12, the tilting shaft 15 of the tilting table 14, the tilting output pulley 50, the inclination transmitting endless belt 48, the tilting input pulley 44, the drive motor base 38 and the body portion 36 do not rotate relative to the frame 12.

The output shaft 40, which is rotated relative to the body portion 36, namely, to the frame 12, rotates the rotation output pulley 46, the rotation transmitting endless belt 52, the rotation input pulley 54 and the input shaft 22 relative to the frame 12, that is, clockwise as seen in the direction of the arrow A.

In a state that the tilting table 14 does not angularly rotate relative to the frame 12, the input shaft 22 is rotated about the axis L1 relative to the frame 12, so that, as mentioned above, the circular table 16 is rotated about the axis L0 relative to the tilting table 14 by the rotation of the output shaft 40 of the circular table drive motor 34.

Consequently, the tilting circular table device 10 can finely and accurately control the rotational angle of the circular table 16 and the rotational angle of the tilting table 14 with a comparatively simple constitution, so that, even if the tilting table 14 is angularly rotated, the circular table 16 does not rotate.

A Second Embodiment

Endless Belt Type

Figure 3:
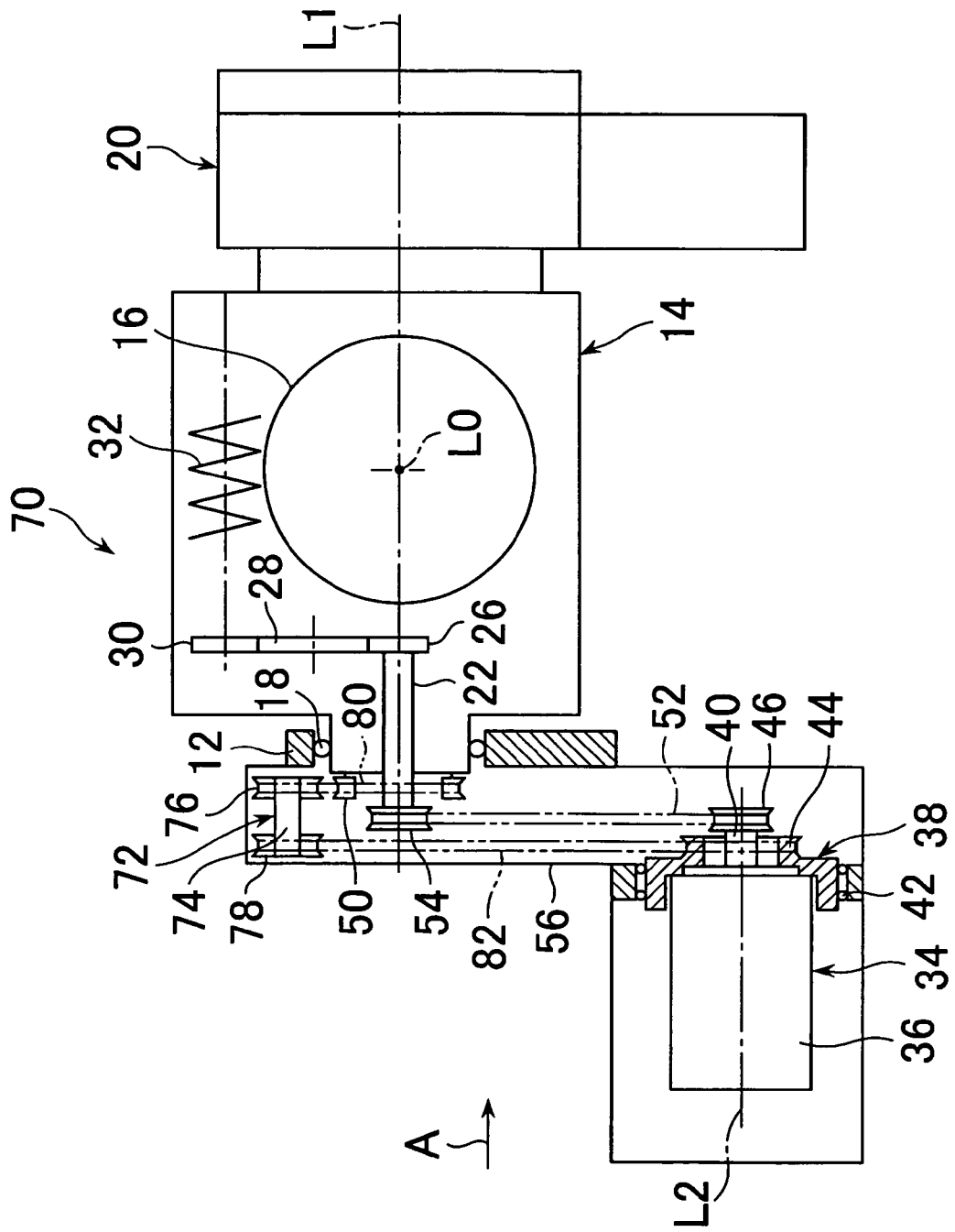
FIG. 3 is a schematic diagram showing a second embodiment of the tilting circular table device according to the present invention.

Referring to FIG. 3, in the tilting circular table device 70, the direction of the circular table drive motor 34 of the tilting circular table device 10 shown in FIG. 1 is changed.

The circular table drive motor 34 is disposed such that the output shaft 40 comes nearer the side of the tilting drive device 20 than the body portion 36 does.

The rotation axis 74 of an intermediate transmitting mechanism 72 for transmitting the angular rotation of the tilting table 14 to the drive motor base 38 is supported so as to rotate relatively to the frame 12.

The intermediate transmitting mechanism 72 assembles a pulley 76 at one end of the rotation axis 74 extending parallel to the axis L1 and a pulley 78 at the other end so as not to rotate relatively.

A first inclination transmitting endless belt 80 spread over the pulley 76 is spread over the tilting output pulley 50, and a second inclination transmitting endless belt 82 spread of the pulley 78 is spread over the tilting input pulley 44. As a result, the rotation of the tilting table 14 about the axis L1 is transmitted to the drive motor base 38 so as to angularly rotate about the axis L2 through the intermediate transmitting mechanism 72.

The follower mechanism according to this embodiment comprises the tilting output pulley 50, the first inclination transmitting endless belt 80, the intermediate transmitting mechanism 72, the second inclination transmitting endless belt 82 and the tilting input pulley 44.

In the tilting circular table device 70, since the intermediate transmitting mechanism 72 is disposed between the tilting output pulley 50 constituting the follower mechanism for transmitting the rotation following inclination of the tilting table 14 and the tilting input pulley 44, the tilting input pulley 44 and the rotation output pulley 46 are disposed in this order in the direction of the arrow A on the axis L2.

The diameter of the pitch circle of the tilting output pulley 50 is set to be identical with the diameter of the pitch circle of the tilting input pulley 44 such that the rotational angle of the drive motor base 38 becomes identical with the rotational angle of the tilting table 14, and the diameter of the pitch circle of the pulley 76 is set to be identical with the diameter of the pitch circle of the pulley 78. The first inclination transmitting endless belt 80 and the second inclination transmitting endless belt 82 are respectively spread over the tilting output pulley 50, the pulleys 76, 78 and the tilting input pulley 44 in a state of an open belt such that the rotational direction of the drive motor base 38 as seen from the direction of the arrow A becomes identical with the rotational angle of the tilting table 14 as seen from the arrow A. Thereby, the angular rotation of the drive motor base 38 follows the angular rotation of the tilting table 14.

The rotation transmitting mechanism, the follower mechanism and the circular table drive motor 34 are covered by the cover 56.

The tilting circular table device 70 acts similarly to the tilting circular table device 10.

A Third Embodiment

Gear Type

As shown in FIG. 4, a tilting circular table device 100 disposes the circular table drive motor 34 such that the axis L2 becomes orthogonal to the axis L1.

A helical gear 102 is assembled into one end of the tilting shaft relatively irrotatably and coaxially.

A rotatable helical gear 104 is assembled into the drive motor base 38 relatively irrotatably and coaxially.

The follower mechanism includes the helical gears 102 and 104. The helical gears 102 and 104 mesh with each other. Consequently, the follower mechanism transmits the rotation of the helical gear 102 about the axis L1 to the drive motor base 38 through the helical gear 104 which rotates about the axis L2.

A helical gear 106 is assembled into the output shaft 40 so as not to rotate relatively and meshes with a helical gear 108 which is assembled into the input shaft 22 so as not to rotate relatively.

The rotation transmitting mechanism includes the helical gears 106 and 108. The helical gears 106 and 108 mesh with each other. Consequently, the rotation transmitting mechanism transmits the rotation of the helical gear 104 about the axis L2 to the input shaft 22 through the helical gear 108 which rotates about the axis L1.

The rotation transmitting mechanism, the follower mechanism and the circular table drive motor 34 are covered by the cover 56.

The tilting circular table device 100 behaves as follows.

When tilting the tilting table 14, namely, when rotating the circular table 16 relative to the frame 12, that is, clockwise as seen from the direction of the arrow A about the axis L1, the tilting drive motor of the tilting drive unit 20 rotates its output shaft clockwise in a state that the output shaft 40 of the circular table drive motor 34 is placed to be relatively irrotatable to the body portion 36.

By this, the tilting drive motor angularly rotates the drive motor base 38 relative to the frame 12, that is, counterclockwise as seen from the direction of the arrow B through the tilting shaft 15 of the tilting table 14, the helical gears 102 and 104 in this order.

When the drive motor base 38 is angularly rotated about the axis L2 relative to the frame 12, that is, counterclockwise as seen from the direction of the arrow B, the body portion 36 is rotated in the same direction by the same angle.

At this time, since the body portion 36 and the output shaft 40 are placed in a relatively irrotatable state, the output shaft 40 is rotated relative to the frame 12, that is, counterclockwise as seen from the arrow B. The rotation of the output shaft 40 rotates the input shaft 22 through the helical gear 106 and the helical gear 108 relative to the frame 12, that is, clockwise as seen from the direction of the arrow A by the same angle as the rotational angle of the tilting table 14.

As shown above, since the input shaft 22 and the tilting table 14 are rotated relative to the frame 12, that is, in the same direction as seen from the direction of the arrow A by the same angle, the circular table 16 does not rotate about the axis L0.

When rotating the circular table 16, namely, when the circular table 16 is rotated relative to the tilting table 14 clockwise about the axis L0 as seen from a workpiece mounting plane of the circular table 16, the circular table drive motor 34 relatively rotates its output shaft 40 relative to the body portion 36 clockwise as seen from the direction of the arrow B.

At this time, since the tilting table 14 is in a state not to angularly rotate about the axis L1 relative to the frame 12, and since the helical gear 102 is combined with the tilting shaft 15 so as not to rotate relatively, the helical gear 102, the helical gear 104, the drive motor base 38 and the body portion 36 do not rotate relative to the frame 12.

Since the output shaft 40 is to be relatively rotated relative to the body portion 36, that is, the frame 12, the output shaft 40 is rotated clockwise relative to the frame 12, that is, clockwise as seen from the direction of the arrow B and rotates the input shaft 22 relative to the frame 12 counterclockwise as seen from the arrow A through the helical gear 106 and the helical gear 108.

Also in the tilting circular table device 100, since the input shaft 22 is rotated about the axis L1 relative to the frame 12 without rotating the tilting table 14 relative to the frame 12, the circular table 16, as mentioned above, is rotated about the axis L0 relative to the tilting table 14 by the rotation of the output shaft 40 of the circular table drive motor 34.

Consequently, the tilting circular table device 100 can angularly control the angular rotation of the circulat table 16 and the tilting table 14 finely and accurately with a comparatively simple constitution, so that even by angularly rotating the tilting table 14, the circular table 16 does not rotate.

Other Embodiments

In the first, second and third embodiments above, it is prerequisite that the tilting table 14 should angularly rotate about the axis L1 and transmission of the rotation by the rotation transmitting mechanism and the follower mechanism are constantly maintained, and if it is possible to maintain, the input shaft 22 may be provided such that its axis is apart from the axis L1 within a plane at right angles to the axis L1 so as to extend parallel to the axis L1, or the input shaft 22 may be provided at right angles to the axis L1. If it is possible to maintain likewise, the direction and arrangement of the circular table drive motor 34 do not matter.

In the first embodiment, the rotation transmitting mechanism may include: a first crank attached to the output shaft 40 of the circular table drive motor 34 so as not to rotate relatively; a second crank attached to the input shaft 22 so as not to rotate relatively, and a first connection rod for transmitting the rotation of the first crank to the second crank. Also, a crank may be applied to the follower mechanism.

In each of the foregoing embodiments, it is possible to make the follower mechanism rotate the body portion 36 synchronously with the angular rotation of the tilting table 14, or to make the follower mechanism complete the rotation of the tilting table 14 and the circular table 14 by the time to start processing.

Consequently, for instance, it is possible to make the body portion 36 rotate independently from the angular rotation of the tilting table 14 so that the circular table 16 may not relatively rotate to the tilting table 14 immediately before or immediately after the tilting table 14 is rotated.

Also, in each of the foregoing embodiments, the body portion 36 is driven so as to make the angles of angular rotations of the tilting table 14 and the input shaft 22 coincide. However, there are cases where the axis of the input shaft 22 does not coincide with the axis L1, or where, according to difference of pitch circle diameters of the pulleys 46 and 54 of the rotation transmitting mechanism, and of numbers of gear teeth of the gears 106 and 108, and the like, the rotational angles of the input shaft 22 and the output shaft 40 difference from each other, so that the rotational angle of the body portion 36 following the angular rotation of the tilting table 14 takes various values, and that the angular rotation of the tilting table 14 sometimes does not coincide with the rotational angle of the body portion 36. Therefore, the follower mechanism positively rotates the body portion 36 so as not to cause relative rotation to the input shaft 22 and the tilting table 14 when the input shaft 22 rotates following the angular rotation of the tilting table 14.

The present invention is not limited to the above embodiments but can be variously modified without departing from its purport.

What is claimed is:

1. A tilting circular table device comprising:
   a frame;
   a tilting table supported on said frame so as to angularly rotate about a first axis;
   a circular table disposed on said tilting table so as to angularly rotate;
   an input shaft for rotating said circular table and disposed on said tilting table so as to angularly rotated about a second axis;
   a drive motor having an output shaft for rotating said input shaft and angularly rotatable about a third axis, and a body portion attached to said frame so as to angularly rotate about said third axis; and
   a follower mechanism for rotating said body portion about said third axis, following said angular rotation of said tilting table.

2. A tilting circular table device claimed in claim 1, wherein said follower mechanism rotates said body portion at the time of rotation of said input shaft following angular rotation of said tilting table, so as not to cause relative rotation between said input shaft and said tilting table.

3. A tilting circular table device claimed in claim 1, wherein said follower mechanism drives said body portion so as to make coincident an angle of angular rotation of said tilting table about said first axis and an angle of angular rotation of said input shaft about said second axis.

4. A tilting circular table device claimed in claim 1, wherein said output shaft is made relatively irrotatable to said body portion while rotation of said output shaft relative to said body portion is stopped.

5. A tilting circular table device claimed in claim 1, wherein said input shaft is rotated about said second axis in the same rotational direction and by the same angle of angular rotation as the rotational direction and as the angle of the angular rotation of said tilting table about said first axis relative to said frame.

6. A tilting circular table device claimed in claim 1, further comprising a rotation transmitting mechanism for transmitting rotation of said output shaft to said input shaft.

7. A tilting circular table device claimed in claim 6, wherein said rotation transmitting mechanism includes: a first pulley attached to said output shaft so as not to rotate relative to said output shaft; a second pulley attached to said input shaft so as not to rotate relative to said input shaft; and a first endless belt for transmitting the rotation of said first pulley to said second pulley.

8. A tilting circular table device claimed in claim 1, wherein said follower mechanism includes: a tilting input pulley attached to said body portion so as not to rotate relative to said body portion; a tilting output pulley attached to said tilting table so as not to rotate relative to said tilting table; and an inclination transmitting endless belt for transmitting the rotation of said tilting input pulley to said tilting output pulley.

9. A tilting circular table device claimed in claim 1, wherein said body portion is attached to said frame so as to angularly rotate and such that said third axis is parallel or orthogonal to said first axis.

10. A tilting circular table device claimed in claim 1, wherein said input shaft is disposed on said tilting table such that said second axis coincides with said first axis.

* * * * *